United States Patent [19]
Ochiai et al.

[11] Patent Number: 5,476,137
[45] Date of Patent: Dec. 19, 1995

[54] ULTRA-PRECISION TEMPERATURE CONTROL SYSTEM FOR MACHINE TOOL AND CONTROL METHOD THEREFOR

[75] Inventors: Akira Ochiai, Susono; Kouya Watanabe, Numazu; Kyoichi Ebisawa; Koichi Urano, both of Maebashi, all of Japan

[73] Assignees: Toshiba Kikai Kabushiki Kaisha, Tokyo; Kanto Seiki Co., Ltd., Maebashi, both of Japan

[21] Appl. No.: 300,845

[22] Filed: Sep. 6, 1994

Related U.S. Application Data

[63] Continuation of Ser. No. 25,769, Mar. 3, 1993, abandoned.

[30] Foreign Application Priority Data

Mar. 13, 1992 [JP] Japan .................. 4-089719

[51] Int. Cl.$^6$ .................. F25B 29/00
[52] U.S. Cl. .................. 165/30; 165/47; 236/78 B; 236/91 F; 236/78 D; 62/DIG. 10; 62/434; 62/435; 62/201
[58] Field of Search .................. 165/47, 30; 236/78 B, 236/91 F, 78 D; 62/DIG. 10, 434, 435, 201

[56] References Cited

U.S. PATENT DOCUMENTS

| | | | |
|---|---|---|---|
| 3,066,578 | 12/1962 | Okton | 165/48.1 |
| 4,117,881 | 10/1978 | Williams et al. | 165/30 |
| 4,262,737 | 4/1981 | Faillare | 165/30 |
| 4,548,259 | 10/1985 | Tezuka et al. | 165/30 |
| 4,651,813 | 3/1987 | Witt et al. | 165/30 |
| 4,729,424 | 3/1988 | Mizimo et al. | 165/30 |
| 4,784,213 | 11/1988 | Eager et al. | 165/30 |
| 4,817,706 | 4/1989 | Miyama et al. | 165/30 |
| 4,984,628 | 1/1991 | Uchida et al. | 165/30 |
| 5,197,537 | 3/1993 | Chigira et al. | 165/47 |

FOREIGN PATENT DOCUMENTS

| | | | |
|---|---|---|---|
| 2438820 | 3/1975 | Germany | 165/26 |
| 0111311 | 5/1987 | Japan | 165/26 |

OTHER PUBLICATIONS

"Constant Power Thyristor Controller", Bob Electronic Co., Ltd., Tokyo, Japan.
Publication 1–51253, Spindle Temperature Controlling Method and Device for Machine Tool, (abstract only), Feb. 27, 1989 (Hiroyuki Fujita).
Fishbeck, James, "Writing P–I–D Control Loops Easily in BASIC", Control Engineering, vol. 25, No. 10, Oct. 1978, pp. 45–47.

*Primary Examiner*—John K. Ford
*Attorney, Agent, or Firm*—Armstrong, Westerman, Hattori, McLeland & Naughton

[57] ABSTRACT

A control system for effecting ultra-precision temperature control for a controlled system having large load fluctuations or including a dead time component. A control unit (5) instructs a high-precision PID temperature controller (10) to renew and correct a control target value $T_{0,NEW}$ for the supply fluid temperature $T_0$ only by a temperature difference $\Delta T = T_C - T_2$ between a set value $T_C$ for the return fluid temperature $T_2$ of a heat transfer fluid and the actually controlled return fluid temperature $T_2$. In response to the instruction, the high-precision PID temperature controller (10) controls the heating power of a heater (17) for heating control through a constant-power thyristor phase controller (16). The heater (17) heats the heat transfer fluid and sends it to a machining apparatus (1) through a closed damping tank (21). The heat transfer fluid exchanges heat with the machining apparatus (1) and is then returned to a precooling means.

4 Claims, 3 Drawing Sheets

ULTRA-PRECISION TEMPERATURE CONTROL SYSTEM FOR MACHINE TOOL AND CONTROL METHOD THEREFOR

This application is a continuation of application Ser. No. 08/025,769 filed Mar. 3, 1993, now abandoned.

BACKGROUND OF THE INVENTION

1. Field of the Invention

The present invention relates to an ultra-precision temperature control system for a machine tool and a control method therefor. More particularly, the present invention relates to a control system for ultra-precisely controlling the temperature of a working fluid used in a machine tool for ultra-precision machining of an optical lens or the like and for, at the same time, measuring and recording temperature data with high accuracy. The present invention also relates to an ultra-precision temperature control method for a machine tool by the above-described control system.

2. Description of the Prior Art

The body of a machine tool for effecting ultra-precision machining of an optical lens or the like must avoid deformation as much as possible. Particularly, it is necessary in order to prevent heat deformation of the machine body to control precisely the temperature of a liquid or gas used as a working fluid for hydrostatic bearings and guide way or a fluid used for a shower system for removing cutting chips. Techniques which have heretofore been employed for such temperature control include a system wherein the range of temperature fluctuations is repeatedly damped by using heat exchangers arranged in a plurality of stages, and another system wherein the range of temperature fluctuations is damped by using a special damping tank (for example, see Japanese Patent Application Post-Exam Publication No. 2-48383 (1990)). However, these control systems aim at minimizing the transient deviation of the supply fluid temperature (i.e., the range of temperature fluctuations).

These control systems are extremely effective when used for systems in which the load on the machine side is constant. However, the conventional control systems cause an increase in the steady-state deviation in regard to controlled systems in which load fluctuations are expected, or which include a large dead time component, that is, a time lag between a change in the input signal and the response to the signal at the output side. The control systems proposed in the past have the unstable nature that the range of fluctuations in the controlled liquid temperature increases due to the time lag, and therefore cannot meet the demand for controlling the liquid temperature precisely. Further, when a machine tool as a controlled system is changed for another, the conventional control systems must change the temperature controller in accordance with the type of machine tool to be used and also need to reset control parameters by obtaining new ones experimentally.

In the meantime, an apparatus for measuring a temperature and storing it in memory is generally provided independently of the temperature controller. High-precision temperature measuring devices having a resolving power of the order of 0.001° C. are now commercially available, for example, a device that converts an electric resistance into a voltage by using a thermocouple or a thermistor and further converts it into a temperature, and a quartz thermometer that utilizes the nature of quartz crystal that the frequency of quartz crystal oscillation regularly changes with temperature.

However, devices such as thermocouple and thermistor are inferior in the linearity of the resistance relative to temperature, that is, the relationship between the resistance and temperature which is mathematically expressed by a linear equation, and these devices are readily affected by a drift or the like. On the other hand, the quartz thermometer is costly because a special sensor and measuring device are required, and it needs data processing to be executed by using a personal computer in order to record the measured data.

Temperature control systems for machine tools are demanded to cope with various kinds of machine tool as controlled system, e.g., systems in which the load is constant, systems in which the load is expected to fluctuate, and systems that have a dead time component, in order to realize ultra-precision machining. Further, it is demanded to construct a flexible control system and minimize the steady-state deviation and transient deviation of temperature.

Recently, temperature control systems for machine tools that perform ultra-precision machining have also been demanded to effect temperature control with a resolving power of 0.001° C., for example, and to process temperature data in units of 0.001° C. However, typical conventional temperature control systems for machine tools lack general-purpose properties and are therefore not usable for other types of machine tool. Further, the conventional systems are incapable of recording and processing data.

SUMMARY OF THE INVENTION

The present invention has been accomplished with the above-described technical background and attains the following objects.

It is an object of the present invention to provide an ultra-precision temperature control system for a machine tool which is capable of ultra-precisely controlling the temperature of a controlled system having large load fluctuations or including a dead time component.

It is another object of the present invention to provide an ultra-precision temperature control system for a machine tool which is capable of measuring and recording temperature control conditions.

To attain the above-described objects, the present invention provides an ultra-precision temperature control system for a machine tool, which includes: a component constituting a part of a machining apparatus and having a heat source; a heat transfer fluid brought into contact with the component to control the temperature of the component to a set temperature; precooling means for cooling the heat transfer fluid coming out of the machining apparatus to a predetermined temperature; a heater for heating the heat transfer fluid sent from the precooling means; heating control means for controlling the heating power of the heater; a closed, heat-insulated damping tank for temporarily storing the heat transfer fluid coming out of the heater and for sending it to the machining apparatus; a machine body temperature sensor for detecting the temperature of the machining apparatus; a supply fluid temperature sensor for detecting the supply fluid temperature of the heat transfer fluid at the outlet of the heater; a machine outlet fluid temperature sensor for detecting the return fluid temperature of the heat transfer fluid at the outlet of the component; and a control unit for calculating a target temperature from temperature data detected by the machine body temperature sensor, the supply fluid temperature sensor, and the machine outlet fluid temperature sensor and for outputting a command signal representative of the target temperature to the heating control means.

The precooling means preferably includes a heat exchanger for cooling the heat transfer fluid with a refrigerant; an electromagnetic expansion valve for controlling the flow rate of the refrigerant; and a precooling temperature controller for controlling the heat transfer fluid to a set temperature by PID controlling the electromagnetic expansion valve.

The heating control means preferably includes a constant-power thyristor phase controller for controlling electric power supplied to the heater for heating control, and a high-precision PID temperature controller for PID controlling the constant-power thyristor phase controller in response to the target temperature command signal from the control unit.

It is possible to realize an even more precise control method by effecting control using the above-described ultra-precision temperature control system such that only a temperature difference between a set value for the return fluid temperature and the actually controlled return fluid temperature is used to determine a control target value for the supply fluid temperature, and the control target value is not changed when the return fluid temperature is within a predetermined temperature range with respect to a target value therefor.

The control unit instructs the high-precision PID temperature controller to renew and correct a control target value $T_{0,NEW}$ for the supply fluid temperature $T_0$ only by a temperature difference $\Delta T = T_C - T_2$ between a set value $T_C$ for the return fluid temperature $T_2$ of the heat transfer fluid and the actually controlled return fluid temperature $T_2$. In response to the instruction, the high-precision PID temperature controller controls the heating power of the heater for heating control through the constant-power thyristor phase controller. The heater heats the heat transfer fluid and sends it to the machining apparatus through the closed damping tank. The heat transfer fluid exchanges heat with the machining apparatus and is then returned to the precooling means.

The present invention provides advantageous effects as stated below:

It is possible to realize ultra-precision temperature control (e.g., in units of 0.001° C.) for a controlled system having large load fluctuations or including a dead time component, which has heretofore been impossible to realize by the prior art.

By employing the control unit as a principal element of the temperature control system, it is possible to construct a total system capable of effecting multiple-purpose, flexible ultra-precision temperature control and of, at the same time, measuring and recording temperature control conditions.

DETAILED DESCRIPTION OF THE EMBODIMENTS

Figure 1:
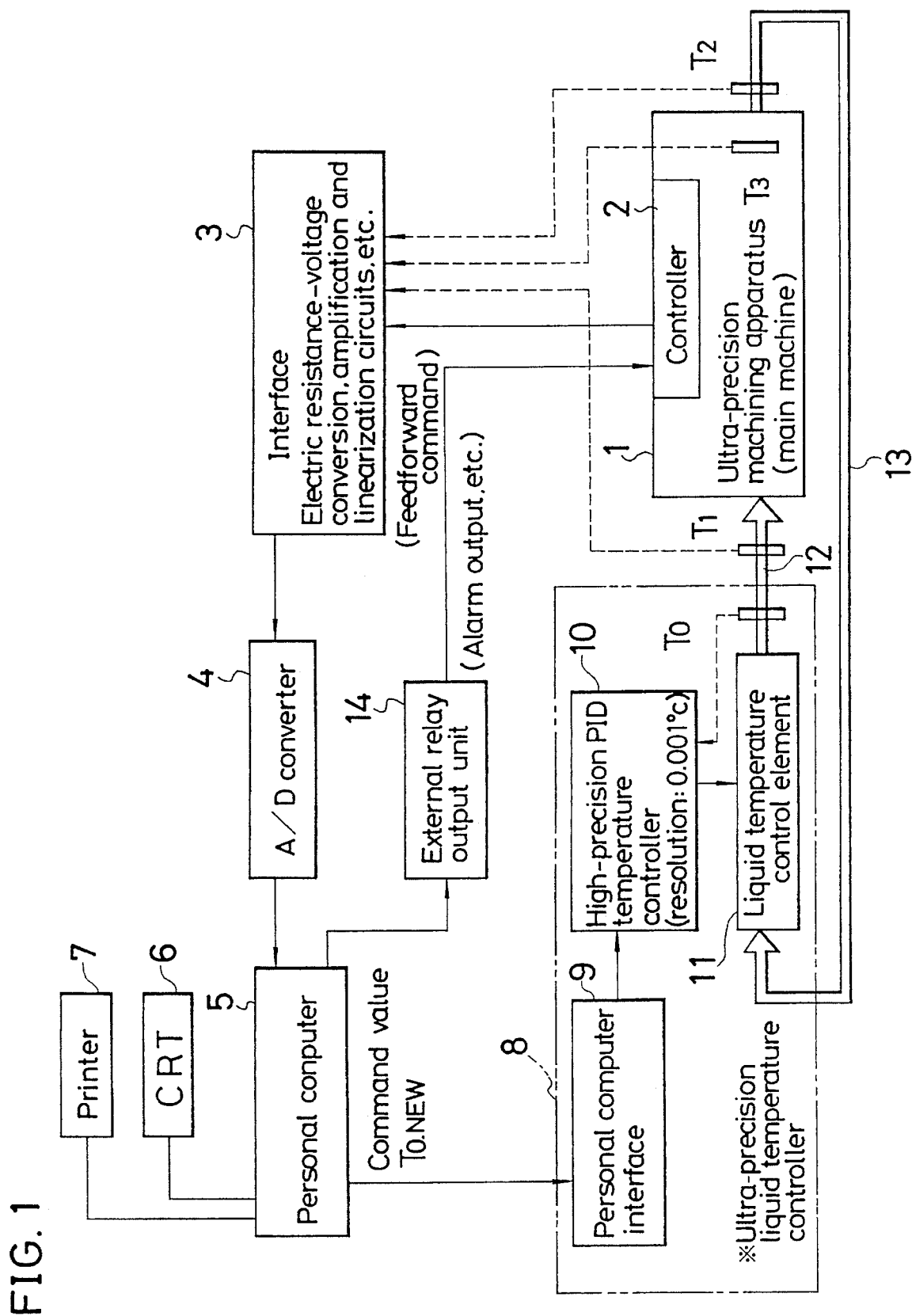
FIG. 1 is a functional block diagram schematically showing one embodiment of the ultra-precision temperature control system for a machine tool according to the present invention.

One embodiment of the present invention will be described below with reference to the accompanying drawings. FIG. 1 is a block diagram schematically showing one embodiment of the ultra-precision temperature control system for a machine tool according to the present invention. In this embodiment, an ultra-precision machining apparatus 1 is a machine tool which performs ultra-precision machining of an optical lens or the like.

The ultra-precision temperature control system in this embodiment is designed to control ultra-precisely the temperature of a hydrostatic working fluid used for a work table having a hydrostatic guide way and bearings. A controller 2 controls the operation of the ultra-precision machining apparatus 1. The controller 2 comprises a programmable controller (PC) 2a and a numerical controller (NC) 2b. The NC 2b is a known controller for controlling the drive of each shaft of the ultra-precision machining apparatus 1.

The controller 2 is connected to a personal computer 5 through an interface 3 and an A/D converter 4. The interface 3 standardizes signal levels in order to send the A/D converter 4 signals representative of the temperature of the body of the ultra-precision machining apparatus 1, the return and supply fluid temperatures of the working fluid and information from the controller 2. In other words, the interface 3 effects processing such as linearizing processing for making the size of a voltage detected by a temperature sensor coincident with the size of a temperature, processing for adjusting the size of a voltage sent to the A/D converter 4.

The A/D converter 4 converts an analog input from the interface 3 into a digital signal. The resulting digital signal is input to the personal computer 5. The personal computer 5 is a known, commercially available personal computer which comprises a microprocessor (MPU), a main memory, and peripheral I/O devices (i.e., a display, a keyboard, etc.) as basic elements. It is mainly a personal, microcomputer. However, the term "personal" as used herein does not necessarily mean "a computer for personal use", but it is employed merely as a name of a type of computer. The personal computer 5 is connected with a CRT 6, a printer 7 and so forth. A target command value $T_{0,NEW}$ for the supply fluid temperature, which is calculated in the personal computer 5, is first input to an ultra-precision liquid temperature controller 8 through a personal computer interface 9.

The personal computer interface 9 standardizes the signal level of the command value $T_{0,NEW}$ received from the personal computer 5 and sends the signal to a high-precision PID temperature controller 10. The high-precision PID temperature controller 10 is a known PID temperature controller whose characteristics can be selected as desired to a certain extent by properly changing the proportional gain, integral time and derivative time. The output signal from the high-precision PID temperature controller 10 is delivered to a liquid temperature control element 11. The liquid temperature control element 11 is a means for heating or cooling a hydrostatic working fluid to the command temperature $T_{0,NEW}$.

The hydrostatic working fluid coming out of the liquid temperature control element 11 is supplied to the ultra-precision machining apparatus 1 through piping 12. The hydrostatic working fluid supplied to the ultra-precision machining apparatus 1 passes through the inside of the apparatus 1 to undergo heat exchange and is then returned to the liquid temperature control element 11 through piping 13.

In the meantime, the personal computer 5 is connected to an external relay output unit 14. The external relay output unit 14 receives a digital signal from the personal computer 5 and outputs it to a relay coil in the form of an analog signal. That is, the external relay output unit 14 outputs an alarm signal or other signal to the PC 2a.

The ultra-precision temperature control system of the present invention decides that an abnormality has occurred when a rapid temperature change or the like has occurred in the ultra-precision machining apparatus 1, and instructs the controller 2 to suspend the ultra-precision machining apparatus 1 when an abnormality has occurred. In the above-described system, four temperature sensors $T_0$, $T_1$, $T_2$ and $T_3$ are disposed at respective positions in the temperature control system. However, it should be noted that the machine inlet liquid temperature sensor $T_1$ is provided merely for measuring and monitoring the temperature, and it is not used as a sensor for control. The supply liquid temperature sensor $T_0$, the machine inlet liquid temperature sensor $T_1$, the machine outlet liquid temperature sensor $T_2$, and the machine body temperature sensor $T_3$ are each formed by using a platinum resistance thermometer bulb of high linearity.

The supply liquid temperature sensor $T_0$ is disposed at the hydrostatic working fluid outlet of the liquid temperature control element 11 to measure the outlet fluid temperature. The machine inlet liquid temperature sensor $T_1$ is disposed at the hydrostatic working fluid inlet of the ultra-precision machining apparatus 1 to measure the inlet fluid temperature. The machine outlet liquid temperature sensor $T_2$ is disposed at a position where the hydrostatic working fluid comes out of the ultra-precision machining apparatus 1 to measure the temperature of the working fluid delivered therefrom. The machine body temperature sensor $T_3$ is disposed in the body of the ultra-precision machining apparatus 1 to measure the temperature of the machine body. The machine body temperature sensor $T_3$ is a sensor for control used to measure the temperature of a part of the machine body having a small time constant and to directly control the machine body temperature.

Figure 2:
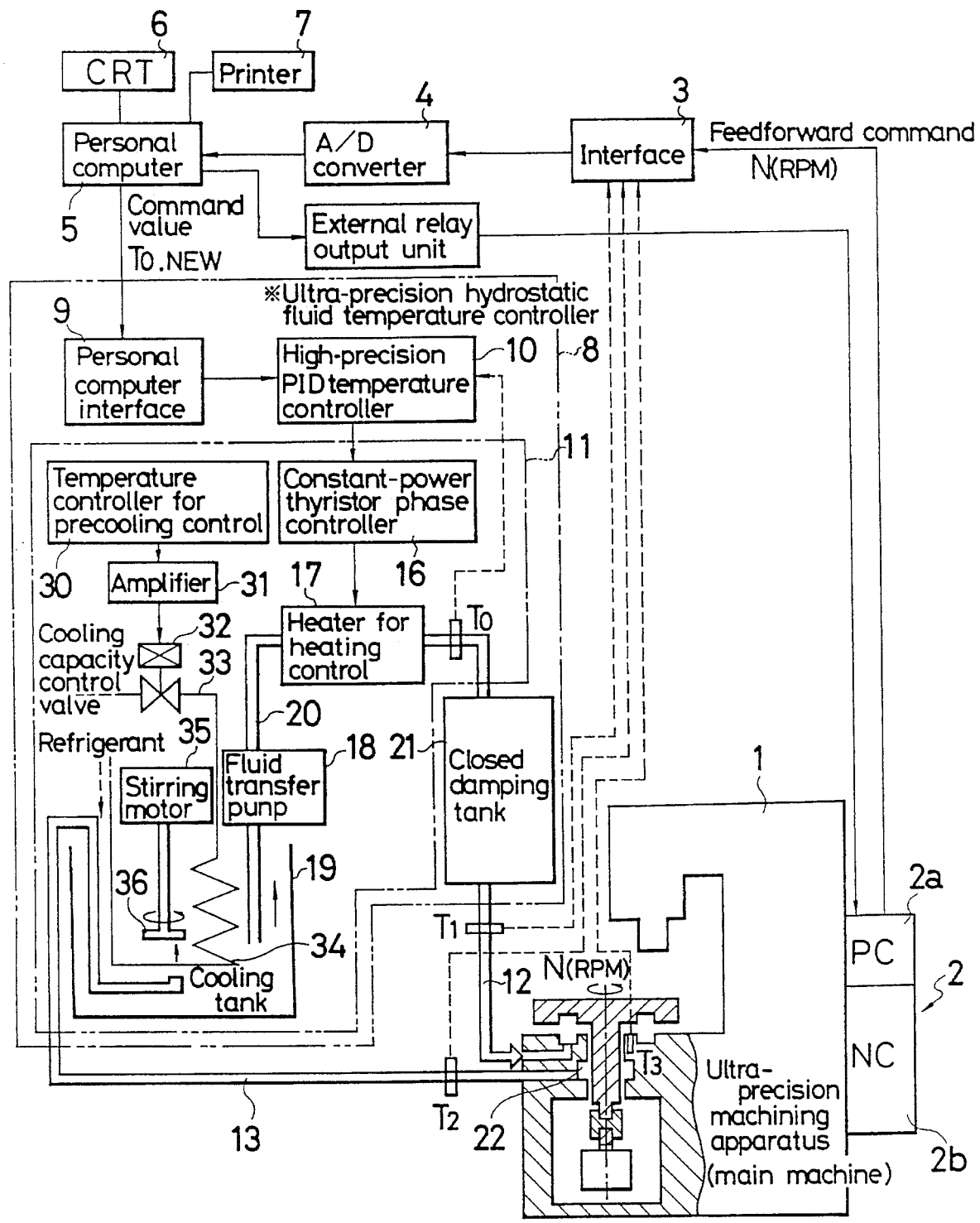
FIG. 2 is a functional block diagram showing the arrangement of FIG. 1 in more detail.

Liquid temperature control element 11:

FIG. 2 is a block diagram showing the arrangement of the system of this embodiment in more detail. The figure shows the details of a system for ultra-precisely controlling and measuring as well as recording the temperature of a hydrostatic working fluid used in a table employing a hydrostatic guide way and bearings in a machine tool that performs ultra-precision machining.

The liquid temperature control element 11 is arranged as follows: The output signal from the high-precision PID temperature controller 10 is input to a constant-power thyristor phase controller 16. The constant-power thyristor phase controller 16 has a known arrangement for effecting phase control in order to control the power of a heater 17 for heating control, that is, the heating power, with high accuracy. The heater 17 for heating control controls the working fluid to the command temperature $T_{0,NEW}$ under control of the constant-power thyristor phase controller 16.

The heater 17 for heating control is supplied with the working fluid from a fluid transfer pump 18. The fluid transfer pump 18 transfers the working fluid under pressure from a cooling tank 19 to the heater 17 through piping 20. The working fluid coming out of the heater 17 is sent to a closed damping tank 21. The closed damping tank 21 is arranged to have superior damping characteristics so as to minimize the range of temperature fluctuations. It is a kind of buffer heat-insulated from the surroundings.

The working fluid coming out of the closed damping tank 21 is supplied to the ultra-precision machining apparatus 1 through the piping 12. The working fluid entering the ultra-precision machining apparatus 1 exchanges heat with the wall of a hydrostatic bearing 22 in the machine body and is then returned to the cooling tank 19 through the piping 13. The working fluid in the cooling tank 19 is controlled so as to maintain a constant temperature at all times.

Precooling means:

A temperature controller 30 for precooling control directly controls the liquid temperature of the working fluid by controlling the opening of an electromagnetic expansion valve 32 provided in a refrigerant flow path 33 by a proportional plus integral plus derivative action, that is, PID control, thereby maintaining the working fluid temperature at a desired level. The working fluid is cooled to a set temperature by heat exchange with the refrigerant flowing through the refrigerant flow path 33. The refrigerant is circulated by a refrigeration compressor (not shown) to perform heat exchange with the working fluid in a heat exchanger 34. The working fluid is constantly stirred with blades 36 driven by a stirring motor 35 so as to be maintained at a uniform temperature in the cooling tank 19.

Figure 3:
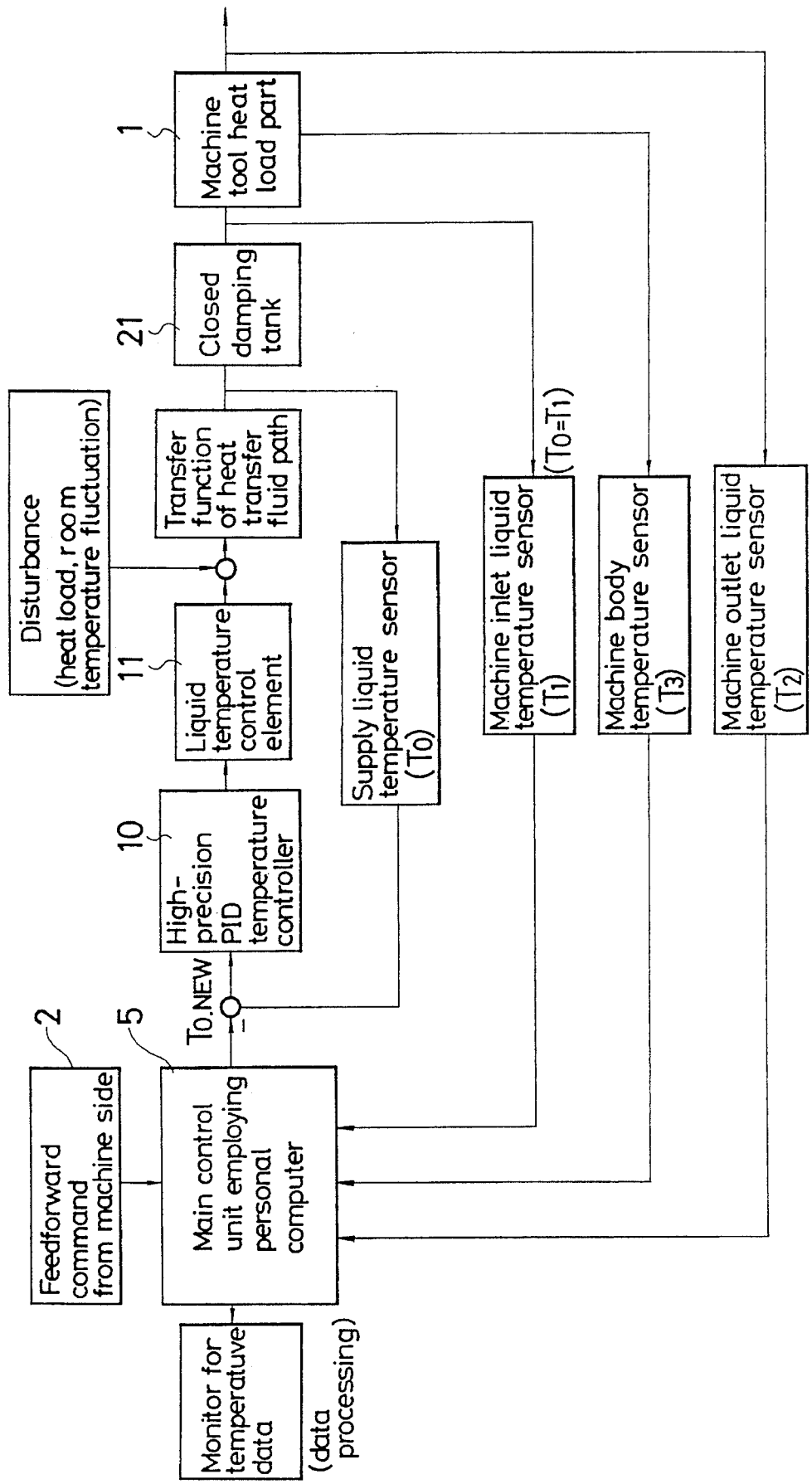
FIG. 3 is a block diagram showing the flow of signals in the ultra-precision temperature control system shown in FIGS. 1 and 2.

Operation:

FIG. 3 is a block diagram showing the control system arrangement of the ultra-precision temperature control system for a machine tool. A feedforward command from the controller 2 is input to the personal computer 5. The personal computer 5 calculates a target value $T_{0,NEW}$ for the supply liquid temperature according to an expression for calculating the temperature of a controlled system, which has been stored in advance, and sends a command signal representative of the target value $T_{0,NEW}$ to the high-precision PID temperature controller 10 through the personal computer interface 9.

On receipt of the command signal representative of the target value $T_{0,NEW}$, the high-precision PID temperature controller 10 sends a command signal representative of a value corresponding to the target value $T_{0,NEW}$ to the constant-power thyristor phase controller 16. In response to the command signal, the constant-power thyristor phase controller 16 controls the heater 17 for heating control so as to effect necessary heating for the working fluid (heat transfer fluid).

The working fluid coming out of the closed damping tank 21 is supplied to the ultra-precision machining apparatus 1. At this time, the temperature of the working fluid is detected by the supply liquid temperature sensor $T_0$, and the signal representative of the detected temperature $T_0$ is fed back to the high-precision PID temperature controller 10 (see FIG. 3).

By feeding back the signal representative of the detected temperature $T_0$ to the high-precision PID temperature controller 10 to thereby form a local feedback circuit, the response of control is quickened. The signal representative of the machine tool body temperature $T_3$ is fed back to the personal computer 5. The machine outlet liquid temperature $T_2$ of the working fluid coming out of the ultra-precision machining apparatus 1 is also fed back to the personal computer 5. As will be understood from the foregoing description, this control system is a kind of cascade control, that is, a control system in which various control units are linked in sequence, each control unit delivering an output signal to change the target value of the next control unit in line.

It should be noted that the closed damping tank 21 is a heat-insulated, closed vessel where there is substantially no diffusion of heat, and therefore, $T_0=T_1$ in a normal state. By passing the working fluid through the closed damping tank 21, the supply fluid temperature is controlled ultra-precisely in units of about 0.005° C.

The personal computer 5 is fed with temperature data from the three temperature sensors $T_0$, $T_2$ and $T_3$ through the interface 3 and via the high-precision A/D converter 4 where the voltage signals are converted into digital signals. The personal computer 5 calculates a command temperature $T_{0,NEW}$ from the temperature information and effects temperature detection with a high resolution of the order of 0.001° C.

It is also possible to feed the interface 3 with a voltage command proportional to the table speed from the PC 2a on the ultra-precision machining apparatus side. With the voltage command used as a feedforward signal, the table speed information is fed to the personal computer 5 to execute data processing. This technique is known, for example, in Japanese Patent Application Laid-Open (KOKAI) No. 64-51253 (1989).

Incidentally, the heat load on the hydrostatic table in this embodiment varies with the number of revolutions of the table. To improve the machining accuracy, it is preferred to control the return fluid temperature (machine outlet liquid temperature) $T_2$ at a constant level rather than to control the supply fluid temperature (machine inlet liquid temperature) $T_1$ at a constant level because the steady-state deviation of the fluid and machine wall temperatures is minimized by controlling the return fluid temperature $T_2$. However, if the heater 17 for heating control is controlled by feeding back only the return fluid temperature $T_2$ to the high-precision PID temperature controller 10, cycling occurs in the case of ordinary PID control because of the dead time between the machine inlet liquid temperature sensor $T_1$ and the machine outlet liquid temperature sensor $T_2$, so that effective control cannot be realized.

Under these circumstances, this embodiment adopts a control method wherein only the temperature difference $\Delta T = T_C - T_2$ between the set value $T_C$ for the return fluid temperature $T_2$ and the actually controlled return fluid temperature $T_2$ is used to renew and correct the control target value $T_{0,NEW}$ for the supply fluid temperature. With this control method, the influence of the time lag can be minimized. Even with this control method, the return fluid temperature $T_2$ fluctuates (waves) in a long cycle due to the time lag between the renewal of the target value $T_{0,NEW}$ and the detection of the return fluid temperature with the sensor $T_2$. To prevent displacement fluctuation caused by such temperature fluctuation, the system is arranged such that when the return fluid temperature $T_2$ is within a predetermined temperature range with respect to the target value (e.g., within the range of ±0.005° C. with respect to the target value), the control target value $T_{0,NEW}$ is not changed, thereby stabilizing the return fluid temperature $T_2$ and suppressing the displacement fluctuation.

Further, with simple feedback control alone, the transient deviation is large during the load fluctuating period, and a considerably long time is needed for the system to settle down to a steady state, that is, the settling time is considerably long. Therefore, feedforward control may be adopted as a means for improving this situation. With the feedforward control, when the load on the ultra-precision machining apparatus 1 is fluctuating, a heat generating condition of the ultra-precision machining apparatus 1 is predicted, and a command temperature $T_{0,NEW}$ corresponding to the predicted heating power is given in anticipation of a time lag in control, thereby making it possible to minimize the transient deviation and improve the response by a large margin. In this case, an optimal control condition is realized by setting proper parameters on the personal computer 5.

In addition, since pieces of temperature data $T_0$, $T_1$, $T_2$ and $T_3$ at the respective positions are fed to the personal computer 5, the controlled condition can be confirmed in detail by data-processing the temperature values, and digitally or graphically recording the temperature information at a predetermined interval of time. After the confirmation, each parameter is changed to bring the control into an ideal state.

Further, since upper and lower limits for alarm have been set in advance for the return fluid temperature $T_2$ under control, if the return fluid temperature $T_2$ exceeds either of the limits owing to some trouble, an alarm signal is output to the ultra-precision machining apparatus 1 through the external relay output unit 14. Thus, the control system of this embodiment has an alarm output function.

Other Embodiments:

Although in the foregoing embodiment the return fluid temperature $T_2$ is controlled, the present invention is not necessarily limited thereto. The temperature as the object of control can be changed as desired simply by changing the computing expression on the personal computer 5 so as to effect other control, for example, direct control in which the machine body temperature is detected by the sensor $T_3$ and controlled so that the machine body temperature $T_3$ reaches the target value, or means value control in which the fluid temperature is controlled so that a mean value of the supply and return fluid temperatures reaches the target value.

Although in the foregoing embodiment the temperature of the hydrostatic working fluid used for a work table is ultra-precisely controlled, the present invention may also be applied to a system for controlling the temperature of other fluid used for machine tools, for example, a spindle cooling fluid, a cutting or grinding fluid for cooling a workpiece, etc.

What is claimed is:

1. An ultra-precision temperature control system for a machine tool, comprising:

a component constituting a part of a machining apparatus and having a heat source;

a heat transfer fluid brought into contact with said component to control a temperature of said component to a set temperature;

precooling means for cooling said heat transfer fluid coming out of said machining apparatus to a predetermined temperature;

a heater for heating said heat transfer fluid sent from said precooling means;

heating control means for controlling a heating power of said heater, wherein said heating control means includes a constant-power thyristor phase controller for controlling electric power supplied to said heater for heating control;

a closed, heat-insulated damping tank for temporarily storing said heat transfer fluid coming out of said heater and for sending it to said machining apparatus;

a machine body temperature sensor for detecting a temperature of said machining apparatus;

a supply fluid temperature sensor for detecting a supply fluid temperature of said heat transfer fluid at an outlet of said heater;

a machine outlet fluid temperature sensor for detecting a return fluid temperature of said heat transfer fluid at an outlet of said component;

a digital computer for calculating a target temperature for said supply fluid temperature and for outputting a command signal representative of said target temperature to said heating control means; and wherein said digital computer includes:

(a) means for calculating a target temperature (To,

NEW) based on a temperature difference from a prior target temperature (To,OLD) and a difference between a set value (Tc) and an actually controlled temperature value (Tx) which is based on at least one of said machine body temperature sensor and said machine outlet fluid temperature sensor, according to the following formula:

$$To,New = To,OLD + (Tc - Tx),$$

and
- (b) means for sending a signal to said heating control means to effect heating towards said target temperature (To,NEW); and
- (c) means for maintaining said target temperature not changed when said actually controlled temperature value (Tx) is within a predetermined temperature range with respect to a target value therefor.

2. An ultra-precision temperature control system according to claim 1, wherein said precooling means includes:

a heat exchanger for cooling said heat transfer fluid with a refrigerant;

an electromagnetic expansion valve for controlling a flow rate of said refrigerant; and a precooling temperature controller for controlling said heat transfer fluid to a set temperature by PID controlling said electromagnetic expansion valve.

3. An ultra-precision temperature control system according to claim 1 or 2, wherein said heating control means includes:

a high-precision PID temperature controller for PID controlling said constant-power thyristor phase controller in response to said target temperature command signal from said control unit.

4. An ultra-precision temperature control system according to claim 1, wherein the actually controlled temperature value (Tx) is based on said machine outlet fluid temperature sensor (T2).

* * * * *